Dec. 15, 1964                I. D. LINEHAN                3,160,961
                    CLINOMETER LEVEL WITH RISE INDICATOR
Filed Nov. 29, 1961                                  2 Sheets-Sheet 1
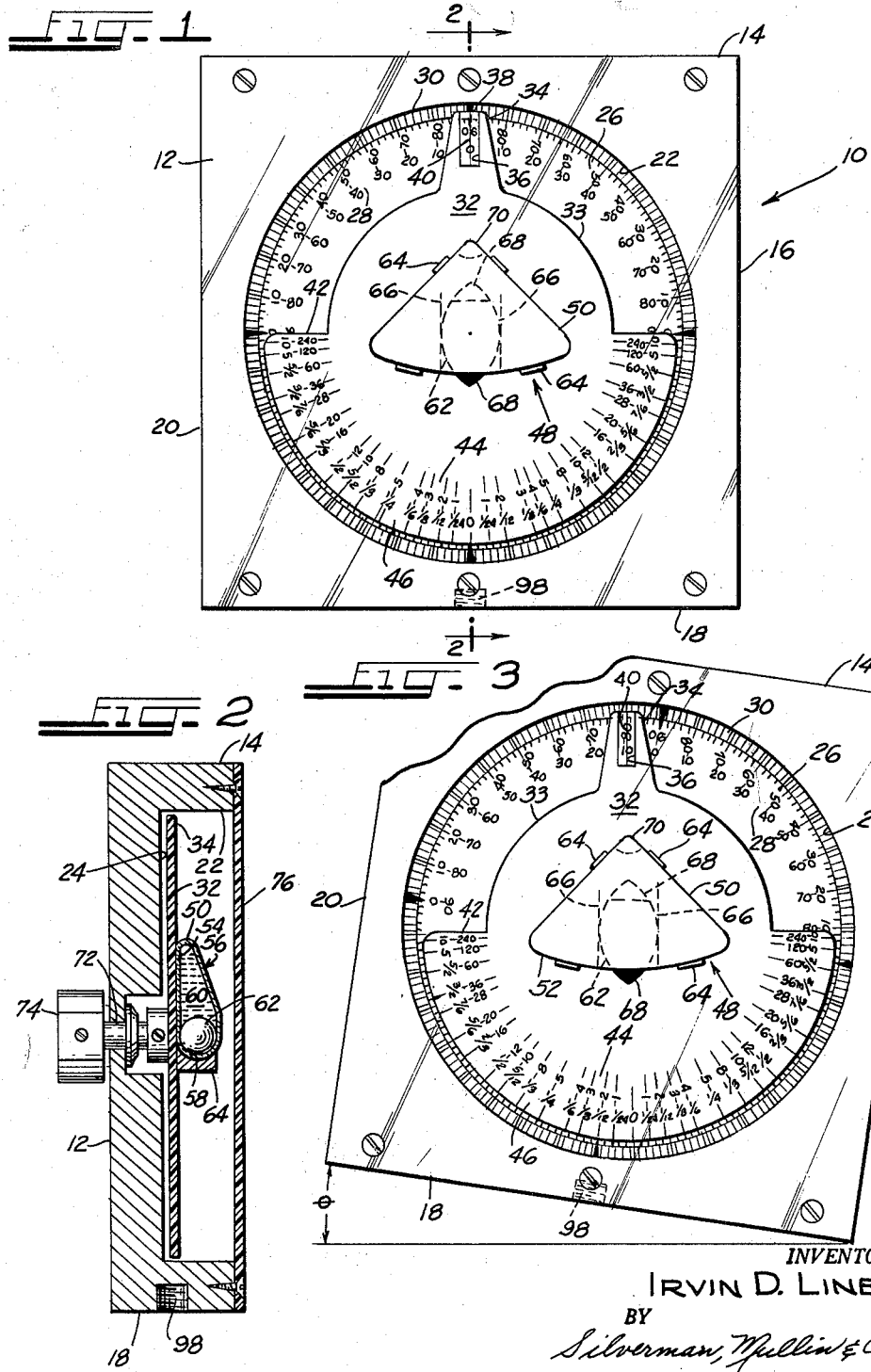
INVENTOR.
IRVIN D. LINEHAN
BY
Silverman, Mullin & Cass
ATTYS.

Dec. 15, 1964  I. D. LINEHAN  3,160,961
CLINOMETER LEVEL WITH RISE INDICATOR
Filed Nov. 29, 1961  2 Sheets-Sheet 2
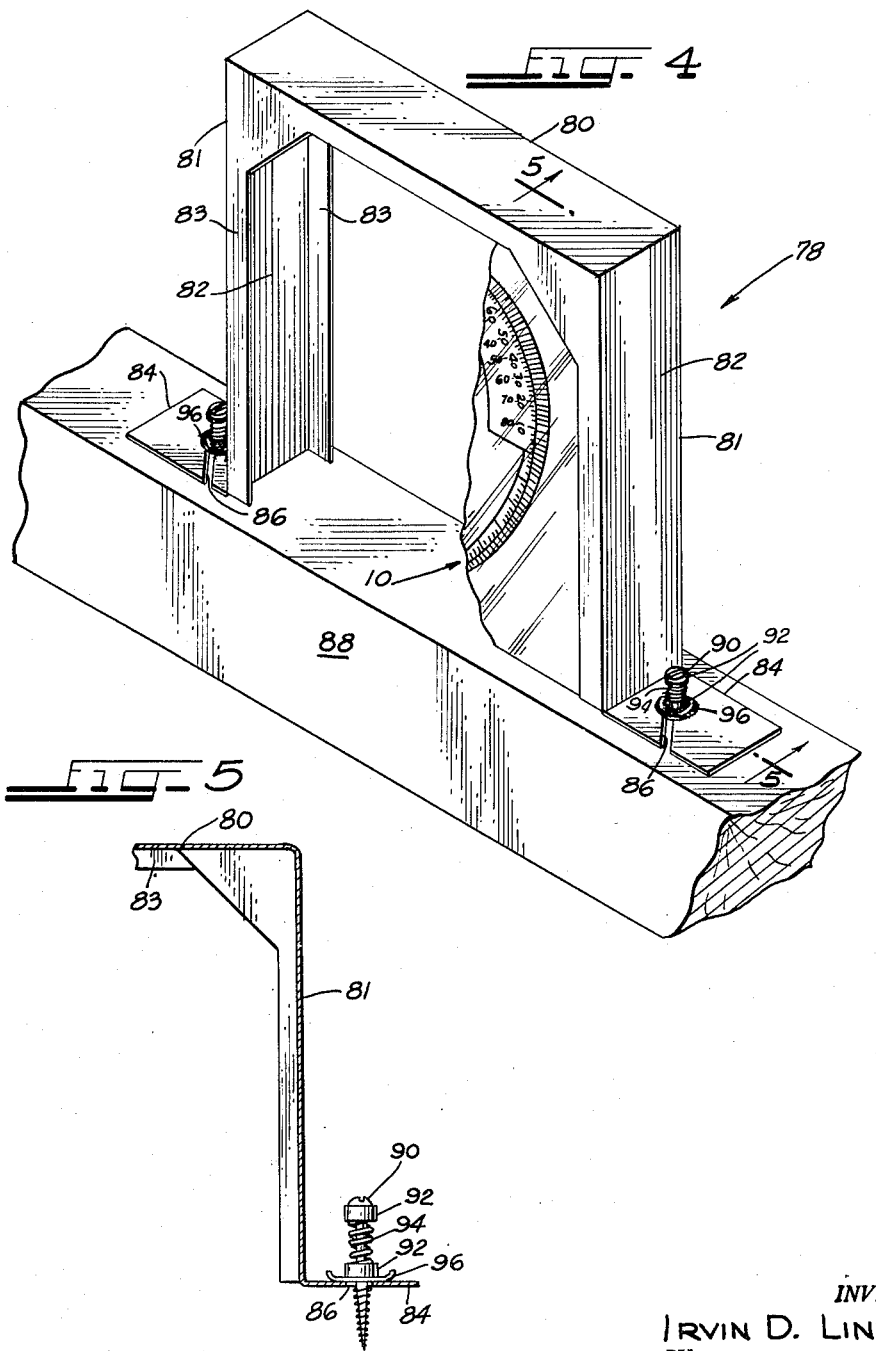
INVENTOR.
IRVIN D. LINEHAN

United States Patent Office 3,160,961
Patented Dec. 15, 1964

3,160,961
CLINOMETER LEVEL WITH RISE INDICATOR
Irvin D. Linehan, 1011 E. Rockwell,
Arlington Heights, Ill.
Filed Nov. 29, 1961, Ser. No. 155,566
8 Claims. (Cl. 33—210)

This invention relates generally to surveying and measuring devices for use as construction aids by carpenters or similar artisans and more particularly to a novel multi-purpose clinometer type level having automatic rise and pitch indicators incorporated therein.

Basic construction-aid measuring devices such as levels, carpenters squares, protractors, and even clinometers are well known and widely used. Heretofore, by utilizing a combination of all of such basic measuring devices and a knowledge of geometry and trigonometry, the various dimensions and measurements required for construction work, such as the rise of a roof ridge above the wall plates, the angle of inclination of a rafter or other surface, the rise of a surface or rafter in inches per foot, etc., could be obtained or computed. However, it is well known that the average tradesman has neither the mathematical knowledge nor the time to make such computations on the job. In addition, the disadvantages inherent in the use of so many different devices are obvious. There has thus existed a long felt need for a simple measuring device which could combine the functions of all or many of the basic measuring devices now in use and furnish certain information by direct reading rather than necessitating computation.

Although multi-purpose measuring devices of the type under consideration have heretofore been attempted, they have invariably been characterized by disadvantageous features which have limited the more universal acceptance thereof. Thus, for example, many of the prior devices were excessively costly, complex of structure and difficult to operate and understand. Some of the prior devices were too limited in versatility to warrant the expenditure therefor, while others were not adequately accurate in all of their purported functions. Still other of the prior devices had markings or scales on two or more sides thereof which necessitated excessive repositioning or resetting of the device before all of the required information could be obtained therefrom.

It is therefore an important object of this invention to provide a multi-purpose measuring device of the character described which combines the functions of a plurality of prior basic devices including the level, protractor, square and clinometer.

Another important object is to afford a measuring device of the character described which additionally functions simultaneously and automatically as a rise and pitch indicator.

A further object is to provide a measuring device of the character described in which all of the information obtainable therefrom is readable from a single face thereof so that no adjusting, repositioning or resetting of the device is required. There is thus required only a single setting of the device with each use thereof.

Still another object is to afford a measuring device of the character described in which is incorporated a novel type level of greater accuracy than prior levels.

Yet another object is to provide a measuring device of the character described having novel angular scales and indicia marked thereon. The device thus may be turned in any direction for use and an angular scale will nonetheless be in upright position for ready reading by the user thereof.

Still a further object is to afford a measuring device of the character described which is conveniently compact in size and yet is extremely accurate in all of its functions. In this regard, the device may be utilized on extremely large surfaces as well as smaller surfaces.

Yet a further object is to provide a measuring device of the character described having novel means for attaching the same to an auxiliary straight edge when desired.

Another object is to afford a measuring device of the character described which may be inexpensively fabricated and yet is most durable, simple to operate, and efficient for the purposes intended.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a front elevational view of a multi-purpose measuring device embodying the principles of the invention;

FIG. 2 is a cross-sectional view taken on the plane of line 2—2 in FIG. 1 and viewed in the direction indicated;

FIG. 3 is a fragmentary front elevational view showing the device in actual use;

FIG. 4 is an enlarged fragmentary perspective view showing the means for removably attaching the device to a straight edge; and FIG. 5 is a sectional view taken on the plane of line 5—5 in FIG. 4 and viewed in the direction indicated.

Turning now to FIGS. 1 and 2 of the drawings, the reference character 10 indicates generally a multi-purpose surveying and measuring device embodying the principles of the invention. The measuring device 10 comprises a body member 12 which may be square in configuration having straight flat side walls 14, 16, 18 and 20. The body member 12 may be integrally formed of any suitable durable material such as wood or various metals, and the same is provided with an annular recess 22 opening to the front thereof.

A rear wall 24 of the recess 22 is provided with a protractor scale 26 having indicia thereon designating angles from 0° to 90° as indicated. The diameters of the opposed 0° markings are perpendicular to the respective side walls of the body member 12, and it will thus be appreciated that any of the side walls 14, 16, 18 or 20 may be employed as the straight edge for the device. It is important to note that the protractor scale 26 includes an inner scale 28 having complemental angular markings and that said markings are arranged normally to the markings of the basic protractor scale 26. It will thus be seen that no matter which way the device 10 is turned, one of the two scales 26 or 28 will be properly positioned in upright relationship for convenient reading.

For even greater accuracy and ease of reading, the protractor scale 26 includes also a cooperating outer scale 30. The outer scale 30 is marked only in odd numbered degree readings to cooperate with the even numbered degree readings of the basic protractor scale 26. Accurate angular readings thus may be made even to fractions of a degree.

Rotatably mounted on the rear wall 24 of the recess 22 is an indicator disc 32. The indicator disc 32 is generally of circular configuration, with one half 33 thereof being of reduced diameter and being provided with a projecting pointer finger 34. The pointer finger 34 affords the pointer or indicator for cooperating with the protractor scales, and the same may be of any suitable shape for this purpose, although I prefer that the finger be formed with a relatively wide cut-out slot 36. A transparent window 38, made of plastic or the like, is positioned to cover the cut-out slot 36, and a fine hair-line 40 is etched or otherwise suitably imprinted thereon.

The opposite half 42 of the indicator disc 32 is of a larger diameter and covers the markings of the portions of the scales 26 and 28 over which the same is positioned. The indicator disc portion 42 is marked with a first scale 44 for indicating rise per unit of length, and in this case the scale 44 is calibrated to give readings in inches of rise per foot of length or "run." It will be observed that the scale 44 is symmetrically graduated on both sides of the "zero" reading indicia.

A second scale 46 is similarly marked on the indicator disc portion 42, and this scale is calibrated in fractions to give the pitch of a roof, or the rise of the rafters per unit of roof span. Thus, for example, a rise of 4 inches per foot of run is equivalent to a roof pitch of 1/6, viz., 4 inches per 2 feet of roof span.

Mounted centrally on the indicator disc 32 is a novel level indicated generally by the numeral 48. The level 48 comprises a transparent vial 50 of glass or the like which may be generally triangular in configuration but has a slightly arcuate bottom side or base 52. The vial 50 comprises a back wall 54, a tapering front wall 56 and an arcuate bottom wall 58 (see FIG. 2). The vial 50 is almost completely filled with a suitable liquid 60, which may comprise non-freezable glycerine and a solvent, and a ball of a suitable material such as agate or glass is positioned therein. The vial 50 is mounted on the indicator disc 32 by any suitable means such as the brackets 64, and centering guide lines such as 66 may be marked on the indicator disc. In addition to the centering guide lines 66, the indicator disc 32 may also be marked with a pair of cooperating triangular guide marks 68, 68.

Referring to FIGS. 1 through 3 of the drawings, the extreme accuracy of the level 48 may now be appreciated. At the outset, it will be noted that the ball 62 makes contact only on its bottom surface with the bottom wall 58 so that the frictional forces which might otherwise retard its free rolling motion are held to a minimum. The centering guide lines 66 are, of course, utilized to center the ball 62. It should be additionally noted, however, that the light diffraction and magnification caused by the glass vial 50 and the liquid 60 gives the ball 62 an ovate appearance as indicated. The light diffraction and magnification is increased because of the novel shape of the vial 50 which includes the tapered front wall 56 curving smoothly into the bottom wall 58 which itself is both arcuate in cross-section and curved in elevation. When the ball 62 is perfectly centered, its distorted image will align with the triangular guide marks 68 to compositely form a continuous oval. Still another accuracy check is provided by the novel level, because when the ball 62 is perfectly centered, the air bubble 70 in the liquid will be positioned at the apex of the triangular vial 50.

Although the above-described level 48 is preferred, less accurate conventional levels or spirit bubble members may be substituted for the preferred embodiment.

Suitable means are provided for rotating or adjusting the indicator disc 32. Thus, for example, a shaft 72 (FIG. 2) may be connected to the disc so that it extends out through the back of the body member 12. A handle or knob 74 may then be mounted on the shaft 72 whereby the indicator disc 32 may be readily rotated as desired.

For purposes of protecting the scales and the level, a transparent cover 76 of plastic or the like may be mounted on the front of the device 10 to close the recess 22.

It is believed that the operation of the device 10 should be apparent from the foregoing description to those skilled in the art. Thus, for example, let us suppose that the user is confronted with the problem of building a surface at an inclination of 9° to the horizontal. He may thereupon set the hair-line 40 at 9° on the scales 26 or 28 as indicated in FIG. 3 of the drawings. If the straight edge 18 is now positioned on the horizontal surface, the same must be tilted upwardly exactly 9° in order to center the level ball 62. The user may now use the straight edge 18 for laying out the inclined surface. Simultaneously, it will be noted that the scale 44 indicates that the rise for the desired inclination is 1.9 inches per foot of running horizontal surface. At the same time, the indicated pitch of a roof made with this rise is slightly less than 1/12. Of course, the described procedure may be reversed or begun with any of the given or known measurements. As an example, the pitch of a roof is usually expressed in construction plans as a fraction, so that the carpenter may immediately set the scale 46 to the designated pitch and quickly obtain all of the other associated measurements.

Turning now to FIGS. 4 and 5 of the drawings, it will be noted that I have provided novel means for readily mounting the device 10 on an elongated straight edge securely but readily removable when desired. The novel means comprises a channel-shaped frame 78 having a web 80 interconnecting a pair of legs 81, 81. The web 80 and legs 81 are likewise channel-shaped in cross-section with a web 82 and legs 83, 83 so that the frame 78 fits over the device 10 in contour-accommodating relationship. Projecting from the bottom of the legs 81 is a pair of horizontally bent arms 84, 84. Each of the arms 84 is formed with an angular bayonet-type slot 86.

To mount the device and frame assembly on a straight edge such as 88, a pair of spring loaded screws 90 is employed. Each of the screws 90 has mounted thereon a pair of washers 92, 92 urged apart by a coil spring 94. An annular disc 96 having upturned peripheral edges as indicated is likewise mounted on the screw between the bottom washer 92 and the top surface of the straight edge 88. The horizontal arms 84 may be readily and removably connected to the straight edge 88 by merely forcing the same under the discs 96 against the action of the springs 94. In this manner, the device 10 may be readily but securely associated in readily removable relationship with a straight edge of any length for use on surfaces of any size.

As an additional refinement, the bottom edge 18 of the body member 12 may be provided with a threaded opening 98 for mounting of the device on a tripod or the like when such use is indicated.

From the foregoing description and drawings, it should be apparent without further description that I have provided a novel clinometer type measuring device which combines the functions of a plurality of known basic measuring devices. The device is extremely accurate in all of its functions, and all of the information and measurements may be quickly obtained with but a single setting of the device. The entire device may be inexpensively fabricated and yet is most versatile, efficient and simple to use and understand. In addition, I provide means whereby the device may be readily connected for use with an auxiliary straight edge of any size.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A measuring device of the character described comprising a body member having at least one straight side edge, a protractor scale on a face of said body member, an indicator disc rotatably mounted on said protractor scale, a level mounted on said indicator disc, means for rotating said indicator disc, a pointer on said indicator disc for cooperating with said protractor scale, a rise scale marked on a portion of said indicator disc opposite from said pointer, said rise scale cooperating with said protractor scale for indicating the rise per unit of horizontal length for any angular setting of said pointer, said level comprising a transparent substantially triangular vial having a slightly arcuate base, a back wall, a tapering front wall and an arcuate bottom wall, a liquid almost completely filling said vial, and a ball positioned in said vial, said ball adapted to roll freely on said arcuate bottom wall, a pair of triangular guidemarks marked on said indicator disc beneath said vial, said tapering and arcuate vial walls and liquid cooperating to distort and magnify the image of said ball so that the same appears ovate, said triangular guide marks cooperating with said distorted image to form an unbroken oval when said ball is perfectly centered.

2. The measuring device of claim 1 in which said liquid contains an air bubble therein, said bubble adapted to position itself at the apex of said triangular vial when said ball is centered on said bottom wall.

3. A measuring device of the character described comprising a body member having at least one straight side edge, a protractor scale on a face of said body member, an indicator disc rotatably mounted on said protractor scale, a level mounted on said indicator disc, means for rotating said indicator disc, a pointer on said indicator disc for cooperating with said protractor scale, a rise scale marked on a portion of said indicator disc opposite from said pointer, said rise scale cooperating with said protractor scale for indicating the rise per unit of horizontal length for any angular setting of said pointer, and mounting means for releasably connecting said device to an auxiliary straight edge, said body member being square in configuration and having four straight side edges, said mounting means comprising a channel shaped frame adapted to embrace said body member in contour accommodating relationship, a pair of horizontal legs projecting outwardly one from each side of said frame, each of said horizontal legs being formed with an angular bayonet-type slot, and spring loaded screw means cooperating with said horizontal legs and slots for releasably connecting said device to said auxiliary straight edge.

4. The measuring device of claim 3 in which said screw means comprises a screw having a pair of washers mounted thereon, a spring mounted on said screw and urging said washers apart, and a disc having upwardly bevelled peripheral edges mounted on said screw between the bottommost of said washers and the top surface of said auxiliary straight edge.

5. In a measuring device of the character described, a level comprising a transparent substantially triangular vial having a slightly arcuate base, a back wall, a tapering front wall and an arcuate bottom wall, a liquid substantially filling said vial and having an air bubble therein, and a ball positioned in said vial and adapted to roll freely on said arcuate bottom wall, said bubble adapted to be positioned at the apex of said triangular vial when said ball is centered on said bottom wall, said tapering and arcuate vial walls and liquid cooperating to magnify and distort the image of said ball.

6. A clinometer type measuring device comprising a square body member having four straight side edges, a protractor scale on the front face of said body member, an indicator disc rotatably mounted on said protractor scale, a level centrally mounted on said indicator disc, means for rotating said indicator disc, a pointer on said indicator disc for cooperating with said protractor scale, a rise scale and a fractional pitch scale marked on a portion of said indicator disc opposite from said pointer, said rise and pitch scales respectively cooperating with said protractor scale to automatically indicate the rise per unit of horizontal length and the pitch of a roof per unit of horizontal span for any angular setting of said pointer, in combination with mounting means for releasably connecting said device to an auxiliary straight edge, said mounting means comprising a channel shaped frame adapted to embrace said body member in contour accommodating relationship, a pair of horizontal legs projecting outwardly one from each side of said frame, each of said horizontal legs being formed with an angular bayonet-type slot, and spring loaded screw means cooperating with said horizontal legs and slots for releasably connecting said device to said auxiliary straight edge.

7. The measuring device of claim 6 in which said screw means comprises a screw having a pair of washers mounted thereon, a spring mounted on said screw and urging said washers apart, and a disc having upwardly bevelled peripheral edges mounted on said screw between the bottommost of said washers and the top surface of said auxiliary straight edge.

8. In combination with a measuring device of the character described and including a body member having at least one straight edge, removable mounting means for releasably connecting said device to an auxiliary straight edge, said mounting means comprising a frame adapted to embrace portions of said body member in contour accommodating relationship, a pair of horizontal legs projecting outwardly one from each side of said frame, each of said horizontal legs being formed with an angular bayonet-type slot, and screw means cooperating with said horizontal legs and slots to connect said device to said straight edge.

References Cited by the Examiner

UNITED STATES PATENTS

| | | | |
|---|---|---|---|
| 1,592,734 | 7/26 | Hagstrom | 33—213 |
| 1,620,469 | 3/27 | Kirkhoff | 33—211 |
| 1,855,651 | 4/32 | Roberson | 33—213 X |
| 2,231,036 | 2/41 | Suverkrop | 33—206 X |
| 2,619,732 | 12/52 | Vickery | 33—214 |
| 2,692,440 | 12/54 | Walters | 33—214 |
| 2,814,128 | 11/57 | Hopkinson | 33—213 |

FOREIGN PATENTS 186,872    9/56    Austria.

ISAAC LISANN, *Primary Examiner.*